(12) United States Patent
Wakayama et al.

(10) Patent No.: US 7,198,825 B2
(45) Date of Patent: Apr. 3, 2007

(54) METHOD OF MANUFACTURING CARBONATE FILM, CARBONATE COMPOSITE MATERIAL, AND METHOD OF MANUFACTURING THE SAME

(75) Inventors: Hiroaki Wakayama, Bristol (GB); Yoshiaki Fukushima, Aichi-gun (JP)

(73) Assignee: Kabushiki Kaisha Toyota Chuo Kenkyusho, Aichi-gun (JP)

( * ) Notice: Subject to any disclaimer, the term of this patent is extended or adjusted under 35 U.S.C. 154(b) by 149 days.

(21) Appl. No.: 10/817,839

(22) Filed: Apr. 6, 2004

(65) Prior Publication Data

US 2004/0197483 A1 Oct. 7, 2004

(30) Foreign Application Priority Data

Apr. 7, 2003 (JP) ............................. 2003-103281

(51) Int. Cl.
*B05D 3/00* (2006.01)
*B05D 1/38* (2006.01)

(52) U.S. Cl. ............... 427/419.2; 427/419.1; 427/430.1; 423/419.1; 423/430

(58) Field of Classification Search ............... 423/430, 423/447.9, 442, 435; 106/465; 427/419.1, 427/419.2, 430.1
See application file for complete search history.

(56) References Cited

U.S. PATENT DOCUMENTS 2,807,858 A * 10/1957 Livingston ................. 423/435
3,706,586 A * 12/1972 Meldrum et al. ........... 106/415
5,007,964 A * 4/1991 Tsukisaka et al. .......... 106/464
5,650,562 A * 7/1997 Jones, Jr. ..................... 73/38
6,093,487 A * 7/2000 Dupuis et al. .............. 428/330
2002/0090462 A1* 7/2002 Obie .......................... 427/415

FOREIGN PATENT DOCUMENTS

JP 2001-261332 9/2001

OTHER PUBLICATIONS

Takashi Kato, et al., "Calcium Carbonate-Organic Hybrid Materials", Advanced Materials, vol. 14, No. 12, Jun. 18, 2002, pp. 869-877.

* cited by examiner

*Primary Examiner*—Kirsten Jolley
(74) *Attorney, Agent, or Firm*—Oblon, Spivak, McClelland, Maier & Neustadt, P.C.

(57) ABSTRACT

A pressure container is filled with a base material having at least part of the surface coated with an organic matrix including at least one member selected from the specific functional groups, and a material solution containing a carbonate material as a material for carbonate film and an organic polymer including at least one member selected from the specific groups. In succession, by supplying $CO_2$ into the pressure container at 2 atm or higher, a carbonate film is deposited on the surface of the organic matrix.

4 Claims, 6 Drawing Sheets

METHOD OF MANUFACTURING CARBONATE FILM, CARBONATE COMPOSITE MATERIAL, AND METHOD OF MANUFACTURING THE SAME

CROSS-REFERENCES TO RELATED APPLICATIONS

The present application claims priority under 35 U.S.C. §119 to Japanese Application No.2003-103281, filed Apr. 7, 2003, entitled "METHOD OF MANUFACTURING CARBONATE FILM, CARBONATE COMPOSITE MATERIAL, AND METHOD OF MANUFACTURING THE SAME". The contents of this application are incorporated herein by reference in their entirety.

BACKGROUND OF THE INVENTION

1. Field of the Invention

The present invention relates to a method of manufacturing carbonate film capable of manufacturing in a short time, a carbonate composite material excellent in strength, and a method of manufacturing the same.

2. Description of the Background

Crystals of carbonate such as calcium carbonate have an excellent strength, and are highly expected as high strength material. Further, when combined with wood or other conventional material, carbonate is expected to be used as a composite material excellent in strength.

As crystals of such carbonate, for example, a pearl layer structure of seashell having unique gloss and sufficient strength is known. In this pearl layer structure of seashell, calcium carbonate crystals of uniform thickness of 1 μm or less form a regular layer structure together with biological polymer. By forming such layer structure, the pearl layer structure of seashell has an excellent strength.

It has been difficult, however, to artificially produce such crystals of carbonate created by biological matter of seashell or the like.

In such background, recently, it has been proposed to disperse $CaCO_3$ in aqueous solution, circulate $CO_2$ gas, produce $CaCO_3$ saturated aqueous solution from the supernatant, and deposit $CaCO_3$ film on a substrate (see non-patent document 1).

[Non-patent document 1]

Advanced Materials, Wiley-VCH, Germany, 2002, vol. 14, p. 869

However, in this conventional method, $CaCO_3$-saturated aqueous solution is used. Accordingly, the solubility is small, and reaction quantity is very small. As a result, it takes several days to manufacture $CaCO_3$ film, and since the production quantity is also small, it is hard to manufacture a large area of $CaCO_3$ film.

Moreover, it is also difficult in the conventional method to manufacture composite material by combining crystals of carbonate such as calcium carbonate with a conventional material.

SUMMARY OF THE INVENTION

The present invention has been made in consideration of such conventional problems, and an object of the present invention is to provide a method of manufacturing carbonate film capable of manufacturing a large area of carbonate film in a short time, a carbonate composite material excellent in strength, and a method of manufacturing the same.

A first aspect of the present invention relates to a method of manufacturing carbonate film comprising the steps of:

filling a pressure container with a base material having at least part of the surface coated with an organic matrix including at least one member selected from the group consisting of carboxyl group, amino group, hydroxyl group, phosphonic acid group, phosphoric acid group, ammonium group, trimethyl ammonium group, sulfonic acid group, and sulfuric acid group, and a material solution containing a carbonate material as a material for carbonate film and an organic polymer including at least one member selected from the group consisting of carboxyl group, amino group, hydroxyl group, phosphonic acid group, phosphoric acid group, ammonium group, trimethyl ammonium group, sulfonic acid group, and sulfuric acid group, and supplying $CO_2$ into the pressure container at 2 atm or higher to deposit a carbonate film on the surface of the organic matrix.

According to the first aspect of the present invention, the base material having at least a part covered with the organic matrix, and the material solution containing carbonate material and organic polymer are processed in the pressure container in the presence of $CO_2$ at 2 atm or higher.

Therefore, $CO_2$ and carbonate material react, and the carbonate is deposited on the surface of the organic matrix on the base material, thereby forming a carbonate film.

The carbonate film is estimated to be formed in the following process.

That is, at least one member possessed by the organic matrix selected from the group consisting of carboxyl group, amino group, hydroxyl group, phosphonic acid group, phosphoric acid group, ammonium group, trimethyl ammonium group, sulfonic acid group, and sulfuric acid group mutually act with part of one or more functional groups possessed by the organic polymer selected from the group consisting of carboxyl group, amino group, hydroxyl group, phosphonic acid group, phosphoric acid group, ammonium group, trimethyl ammonium group, sulfonic acid group, and sulfuric acid group, and at least part of the organic polymer is adsorbed on the surface of the base material. In the organic polymer adsorbed on the surface of the base material, other functional groups than the functional groups adsorbed on the surface of the base material localize cations such as calcium ions contained in the carbonate material at high concentration near the surface of the base material. As a result, crystals are nucleated. In the process of growth of crystals, the organic polymer left over in the solution is adsorbed on the crystals of carbonate and disturbs growth of crystals. As a result, carbonate film is formed.

According to the method of manufacturing the first aspect of the present invention, the carbonate film is formed on the surface of the organic matrix, and a three-layer structure of the base material, organic matrix, and carbonate film is obtained. By selecting a proper material for the base material, it can be used as the base material coated with the carbonate film having unique gloss and high strength. There is exemplified artificial pearl or artificial marble.

After forming the carbonate film, the carbonate film can be peeled from the base material and used.

According to the first aspect of the present invention, the carbonate film is formed in the presence of $CO_2$ at 2 atm or higher. Accordingly, the solubility of $CO_2$ dissolved in the material solution is enhanced. As a result, the carbonate film is deposited quickly and the carbonate film can be manufactured promptly. Since the deposition amount of carbonate is large, a carbonate film of a large area can be manufactured.

In addition, the method of manufacturing the first aspect of the present invention uses $CO_2$ which is inexpensive, nontoxic, and incombustible. Therefore, the carbonate film can be manufactured at low cost and with high safety.

Besides, since $CO_2$ is used at high pressure of 2 atm or higher, $CO_2$ rarely leaks to the atmosphere during manufacture of the carbonate film, and global warming can be prevented.

According to the first aspect of the present invention, it is available to provide a method of manufacturing carbonate film capable of manufacturing a large area of carbonate film in a short time.

According to the second aspect of the present invention, a carbonate composite material comprises crystals of carbonate, and an organic matrix including at least one member selected from the group consisting of carboxyl group, amino group, hydroxyl group, phosphonic acid group, phosphoric acid group, ammonium group, trimethyl ammonium group, sulfonic acid group, and sulfuric acid group, wherein the crystals of carbonate are disposed on the surface and/or in pores of the organic matrix.

According to the second aspect of the present invention, the carbonate composite material is composed of crystals of the carbonate, and the organic matrix such as wood having a plurality of fine pores on the surface and/or in the inside, and crystals of the carbonate are disposed on the surface and/or in the pores of the organic matrix. Since the crystals of carbonate are very high in strength, the carbonate composite material is very high in strength as compared with the organic matrix alone.

According to the second aspect of the present invention, it is available to provide a carbonate composite material excellent in strength.

According to the third aspect of the present invention, a method of manufacturing carbonate composite material, having crystals of carbonate on the surface and/or in pores of an organic matrix, comprises the steps of:

filling a pressure container with an organic matrix including at least one member selected from the group consisting of carboxyl group, amino group, hydroxyl group, phosphonic acid group, phosphoric acid group, ammonium group, trimethyl ammonium group, sulfonic acid group, and sulfuric acid group, and a material solution containing a carbonate material, and supplying $CO_2$ into the pressure container at 2 atm or higher to deposit carbonate film on the surface and/or in pores of the organic matrix.

According to the third aspect of the present invention, the organic matrix and the material solution containing carbonate material are processed in the pressure container in the presence of $CO_2$ at 2 atm or higher.

As a result, the carbonate excellent in strength is deposited on the surface and/or in the pores of the organic matrix. Thus, a carbonate composite material excellent in strength as compared with the organic matrix can be obtained.

The deposition of the carbonate is estimated to proceed as follows.

That is, at least one member possessed by the organic matrix selected from the group consisting of carboxyl group, amino group, hydroxyl group, phosphonic acid group, phosphoric acid group, ammonium group, trimethyl ammonium group, sulfonic acid group, and sulfuric acid group act to localize cations such as calcium ions and/or anions such as carbonic acid ions or hydrocarbon ions contained in the carbonate material at high concentration near the surface of the organic matrix and/or in the pores. As a result, crystals are nucleated, crystals of carbonate grow, and carbonate is deposited.

According to the third aspect of the present invention, the carbonate is deposited in the presence of $CO_2$ at 2 atm or higher. Accordingly, the solubility of $CO_2$ dissolved in the material solution is enhanced. As a result, the carbonate is deposited quickly and the carbonate is deposited promptly on the surface and/or in the pores of the organic matrix. Since the deposition amount of carbonate is large, crystals of carbonate are deposited sufficiently on the surface and/or in the pores of the organic matrix.

In addition, the method of manufacturing the third aspect of the present invention, same as in the first aspect of the present invention, uses $CO_2$ which is inexpensive, nontoxic, and incombustible. Therefore the carbonate composite material can be manufactured at low cost and with high safety.

Besides, since $CO_2$ is used at high pressure of 2 atm or higher, $CO_2$ rarely leaks to the atmosphere during manufacture of the carbonate film, and global warming can be prevented.

Thus, the third aspect of the present invention provides a method of manufacturing carbonate composite material excellent in strength.

DESCRIPTION OF THE PREFERRED EMBODIMENT

Figure 1:
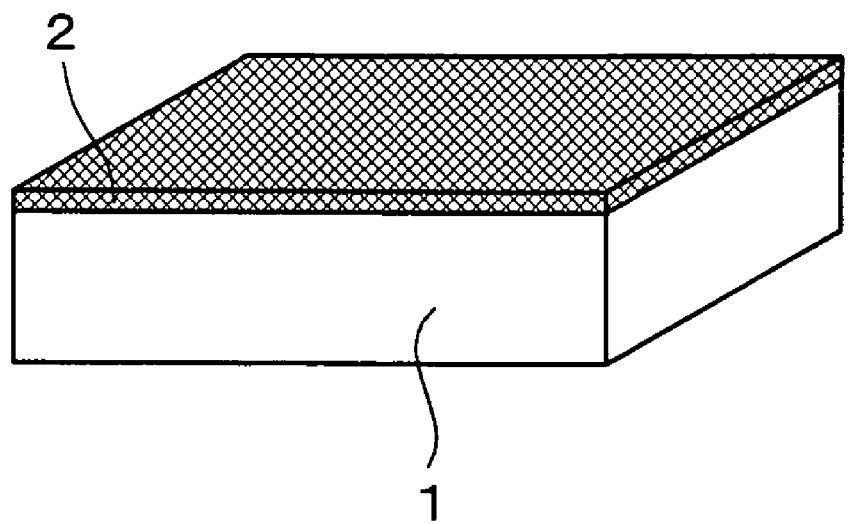
FIG. 1 is an explanatory diagram showing a base material of which upper surface is covered with an organic matrix in embodiment 1 or 2.

In the first aspect of the present invention, as the base material, for example, glass, other ceramics, plastics, metal or wood may be used.

In addition, for the examples of the organic polymer, polyacrylic acid, polyglutamic acid, polyaspartic acid, polyimide, protein, amino acid and derivatives thereof, and related substances may be used.

Moreover, in the first aspect of the present invention and the third aspect of the present invention, $CO_2$ is supplied into the pressure container at 2 atm or higher.

If the pressure is less than 2 atm, solubility of $CO_2$ into the material solution is small. As a result, it takes too much time of manufacture of carbonate film, and it is hard to manufacture a carbonate film of a wide area. At the same time, crystals of carbonate are hardly deposited on the surface and/or in the pores of the organic matrix, and carbonate composite material may not be obtained.

At this time, $CO_2$ can be introduced into the pressure container in a state of supercritical fluid.

In this case, problems possibly occurring when using liquid $CO_2$ can be avoided, such as separation or defective dispersion of the material solution and liquid $CO_2$, and a sufficient quantity of $CO_2$ can be supplied quickly near the base material when manufacturing the carbonate film, or on the surface and/or in the pores of the organic matrix when manufacturing carbonate composite material.

The supercritical fluid refers to a fluid existing at temperature and pressure above the critical point of an ordinary substance. The fluid in this state is a substance having a dissolving ability equivalent to that of liquid, and diffusibility and viscosity similar to those of gas.

In the first to third aspects of the present invention, usable examples of the organic matrix include aspartic acid, cellulose, chitin, chitosan, wood, polyimide, polyacrylic acid, polyvinyl alcohol, and the like. The organic matrix may be modified with a proper functional group. As the organic matrix, either solid or gel may be used.

In the method of manufacturing the third aspect of the present invention, when gel of arbitrary shape is used as the organic matrix, the portion of water of the gel can be replaced with the carbonate. As a result, a carbonate composite material of complicated shape can be manufactured.

In the first to third aspects of the present invention, as the solvent of the material solution, for example, water, alcohol, fused salt or ionic solution, polar organic solvent or the like may be used.

It is preferable that the carbonate material contain at least one member selected from the group consisting of Ca, Mg, Fe, Cu, Co, Mn, and Ni.

In this case, crystals of carbonate film or carbonate excellent in strength and having unique gloss can be formed.

It is preferable that the carbonate material contain at least one member selected from the group consisting of carboxylate, carbonate, alkoxide, oxide, hydroxide, chloride, nitrate, acetyl acetonate and derivatives thereof.

In this case, reacting quickly with $CO_2$, carbonate can be formed.

[Embodiments]
(Embodiments 1)

A embodiment of the first aspect of the present invention is described below.

Figure 2:
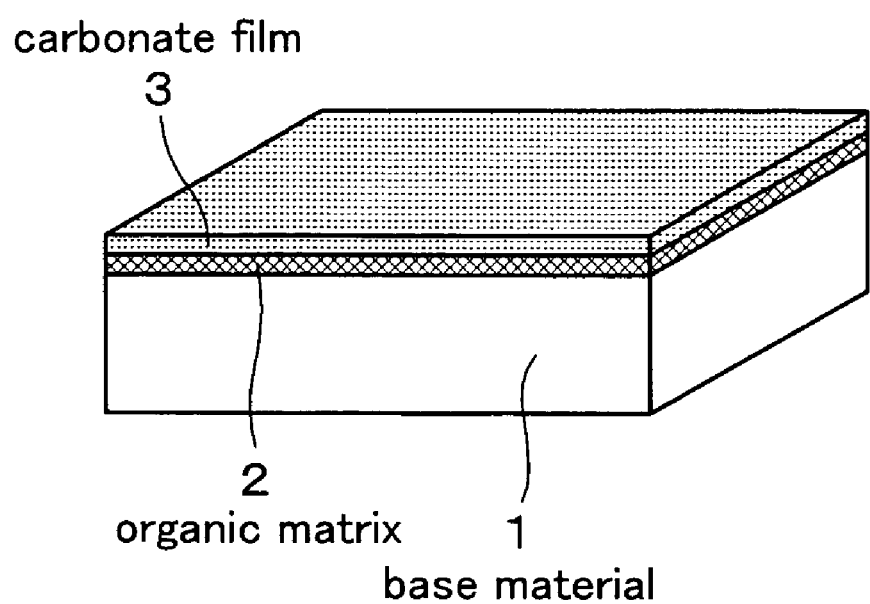
FIG. 2 is an explanatory diagram showing a carbonate film formed on the surface of organic matrix for covering the base material in embodiment 1 or 2.

The method of manufacturing carbonate film in the embodiment, as shown in FIG. 1 and FIG. 2, is characterized by filling a pressure container with a base material 1 having at least part of the surface coated with an organic matrix 2 including at least one member selected from the group consisting of carboxyl group, amino group, hydroxyl group, phosphonic acid group, phosphoric acid group, ammonium group, trimethyl ammonium group, sulfonic acid group, and sulfuric acid group, and a material solution containing a carbonate material as a material for carbonate film 3, and an organic polymer including at least one member selected from the group consisting of carboxyl group, amino group, hydroxyl group, phosphonic acid group, phosphoric acid group, ammonium group, trimethyl ammonium group, sulfonic acid group, and sulfuric acid group.

In succession, by supplying $CO_2$ into the pressure container at 2 atm or higher and heating the pressure container, the carbonate film 1 is deposited on the surface of the organic matrix 2.

The method of manufacturing the embodiment is specifically described below.

As shown in FIG. 1, in the method of manufacturing the embodiment, first of all, a slide glass was prepared as the base material 1 coated with a cellulose film as the organic matrix 2. Specifically, 10 g of $Cu(OH)_2$ was dissolved in 100 mL of 25 wt. % $NH_3$ aqueous solution, and 0.3 g of cellulose powder (Nacalai Tesque, Inc.) was added to 30 mL of its supernatant, and a cellulose solution was prepared.

The slide glass (27 mm×48 mm) was adhered to a spin coat rotor by a double-side adhesive tape, and the cellulose solution was dropped by dropping pipette, and the rotor was rotated at 390 rpm for 60 seconds to perform spin coating operation.

Then, by impregnating and washing in 200 mL of 0.2N solution of HCl and further washing in ion exchanged water, it was dried for 30 minutes at 105° C.

Thus, as shown in FIG. 1, the base material 1 (slide glass) having the upper surface coated with cellulose film as the organic matrix 2 was obtained.

Then, on the organic matrix 2, a calcium carbonate film was fabricated as carbonate film. Specifically, as the organic polymer, 0.024 g of polyacrylic acid (molecular weight: 103) was dissolved in 100 mL of ion exchanged water.

In succession, a material solution mixing 80 mL of this polyacrylic acid aqueous solution and 2.0 g of calcium acetate as the carbonate material was poured into a beaker of 100 mL together with a base material having the upper surface coated with the organic matrix manufactured above, and it was placed in an autoclave with a capacity of 1000 mL.

In this autoclave, $CO_2$ was supplied in a state of supercritical fluid (30 MPa (300 atm), 90° C.), and held for 1 hour in the condition of 90° C. and 30 MPa (300 atm).

When taken out from the autoclave, as shown in FIG. 2, a calcium carbonate film was formed as carbonate film 3. As shown in the drawing, the carbonate film 3 was formed on the organic matrix 2 formed on the upper surface of the substrate 1. The carbonate film 3 was a uniform film with a thickness of 0.6 μm.

In this embodiment, the carbonate was deposited in the presence of $CO_2$ in a state of supercritical fluid (30 MPa (300 atm), 90° C.).

Accordingly, the solubility of $CO_2$ dissolved in the material solution is enhanced. As a result, deposition of carbonate film 3 was promptly promoted, and the carbonate film 3 was deposited on the surface of the organic matrix 2 quickly. Besides, since the deposition amount of carbonate film 3 was also increased, the carbonate film 3 was manufactured in a large area.

(Embodiment 2)

This embodiment is an example of manufacturing multiple layers by laminating a plurality of layers of carbonate film.

First, same as in embodiment 1, as shown in FIG. 1, a base material 1 (slide glass) having the upper surface coated with an organic matrix 2 was prepared, and a calcium carbonate film with a thickness of 0.6 μm was formed as carbonate film 3 on the organic matrix 2 of the base material 1. On the base material 1, as shown in FIG. 2, the organic matrix 2 was formed on the upper surface of the base material 1 same as in embodiment 1, and the carbonate film 3 is formed on the organic matrix 2. Thus, sample 1 was obtained.

In succession, 0.024 g of polyacrylic acid (molecular weight: 103) was dissolved in 100 mL of ion exchanged water, and 80 mL of this polyacrylic acid aqueous solution and 2.0 g of calcium acetate were poured into a beaker of 100 mL together with this sample 1, and it was placed in an autoclave with a capacity of 1000 mL. Then, same as in embodiment 1, in this autoclave, $CO_2$ was supplied in a state of supercritical fluid, and held for 1 hour in the condition of 90° C. and 30 MPa, and a carbonate film was formed. This carbonate film was overlaid and formed on the carbonate film of sample 1.

Figure 3:
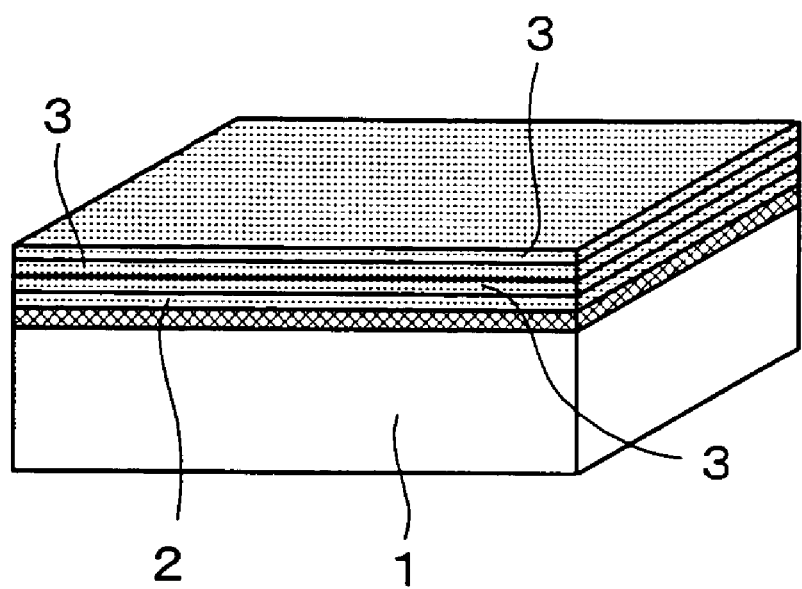
FIG. 3 is an explanatory diagram showing a plurality of layers of carbonate film laminated on the surface of organic matrix for covering the base material in embodiment 2.

By repeating this operation, as shown in FIG. 3, four layers of carbonate film were laminated. As shown in the drawing, the carbonate films 3 manufactured in this embodiment are laminated in four layers on the organic matrix 2 formed on the upper surface of the substrate 1. The thickness of each carbonate film 3 was 0.6 µm, and the thickness was uniform.

(Embodiment 3)

This embodiment is an example of manufacturing a carbonate composite material composed of crystals of carbonate and the organic matrix.

Figure 4:
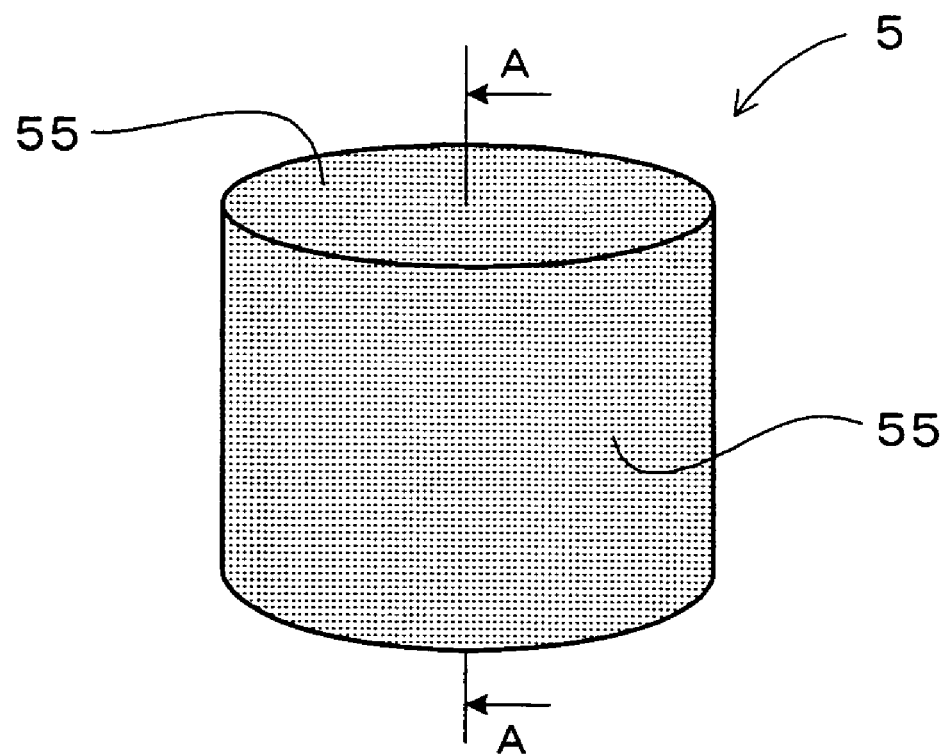
FIG. 4 is an explanatory diagram showing a general appearance of carbonate composite material in embodiment 3.
Figure 5:
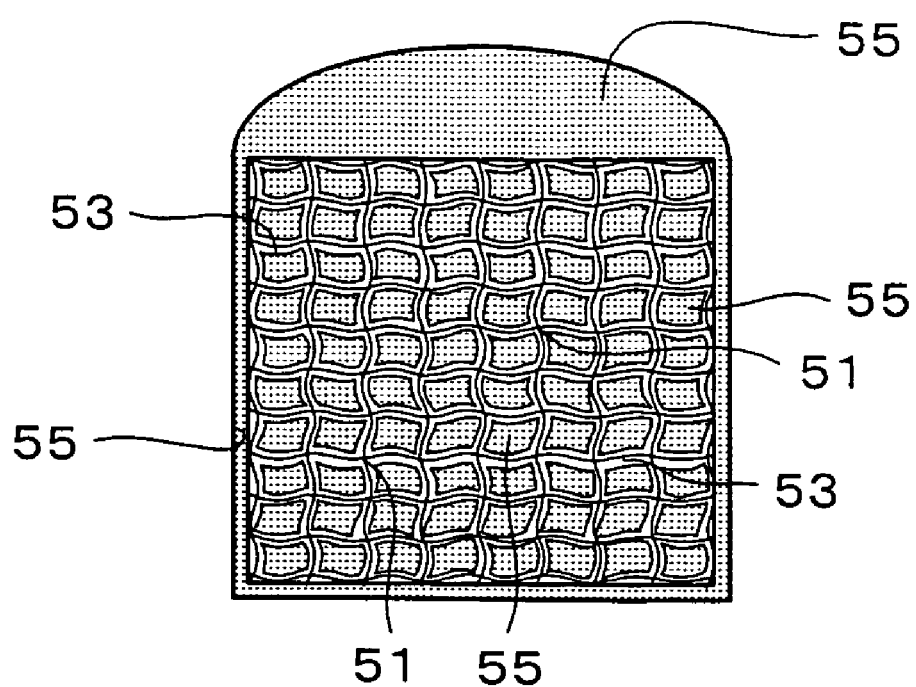
FIG. 5 is a sectional view taken in the direction of the arrows substantially along line A—A in FIG. 4.
Figure 6:
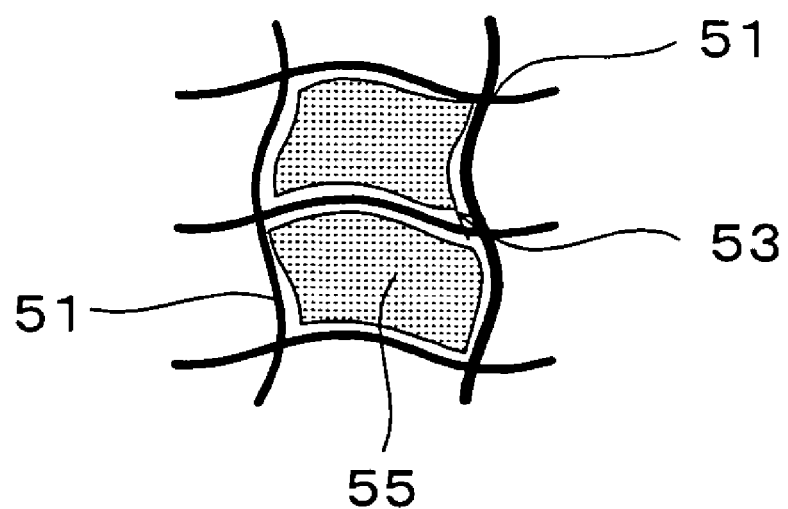
FIG. 6 is a magnified view of pores having carbonate in carbonate composite material in embodiment 3.

As shown in FIG. 4 and FIG. 5, the carbonate composite material 5 of the embodiment is a carbonate composite material composed of crystals of carbonate 55, and an organic matrix 51 including at least one member selected from the group consisting of carboxyl group, amino group, hydroxyl group, phosphonic acid group, phosphoric acid group, ammonium group, trimethyl ammonium group, sulfonic acid group, and sulfuric acid group. As shown in FIG. 4 to FIG. 6, the crystals of the carbonate 55 are disposed on the surface and in pores 53 of the organic matrix 51. FIG. 6 is a magnified view of pores 53 of the carbonate composite material 5 shown in FIG. 5.

The carbonate composite material 5 of the embodiment is cylindrical white lumps as shown in FIG. 4 and FIG. 5. The white lumps of carbonate composite material 5 are composed of crystals of calcium carbonate as carbonate 55 and carboxymethyl cellulose Na (CMC-Na) in gel form as the organic matrix 51. As shown in FIG. 5 and FIG. 6, crystals of the carbonate 55 cover the surface of the organic matrix 51, and are disposed in the pores 53 of the organic matrix 51.

Since the crystals of the carbonate 55 are very high in strength, the carbonate composite material 5 is higher in strength as compared with the organic matrix 51 alone.

Then, a method of manufacturing carbonate composite material of the embodiment is explained.

The method of manufacturing the embodiment, as shown in FIG. 4 to FIG. 6, manufactures a carbonate composite material 5 having crystals of carbonate 55 on the surface and/or in the pores 53 of the organic matrix 51. In the method of manufacturing the embodiment, a pressure container is filled with an organic matrix 51 including at least one member selected from the group consisting of carboxyl group, amino group, hydroxyl group, phosphonic acid group, phosphoric acid group, ammonium group, trimethyl ammonium group, sulfonic acid group, and sulfuric acid group, and a material solution containing a carbonate material.

In succession, by supplying $CO_2$ into the pressure container at 2 atm or higher and heating the pressure container, carbonate is deposited on the surface and/or in pores of the organic matrix.

The method of manufacturing the embodiment is more specifically described.

Mixing 4 wt. % aqueous solution of carboxymethyl cellulose Na (CMC-Na) and 240 g of calcium acetate as carbonate material, 50 mL of gel was prepared, and put into a glass cylindrical container with a capacity of 100 mL. This gel (the organic matrix) is composed of skeleton of CMC-Na and a plurality of pores, and the pores are filled with aqueous solution of calcium acetate as the carbonate material.

The glass cylindrical container was placed in an autoclave with a capacity of 1000 mL, and $CO_2$ was supplied into the autoclave in a state of supercritical fluid (90° C., 30 MPa (300 atm)), and held for 1 hour in the condition of 90° C. and 30 MPa.

When taken out from the autoclave, washing in water and drying, a carbonate composite material 5 was obtained as shown in FIG. 4 and FIG. 5.

In this carbonate composite material 5, crystals of carbonate 55 excellent in strength are applied to coat the surface of the organic matrix 51, and also placed in the pores 53 of the organic matrix 51.

Therefore, the carbonate composite material 5 is higher in strength as compared with the organic matrix 51 alone.

In the method of manufacturing the embodiment, the carbonate is deposited in the presence of $CO_2$ in a state of supercritical fluid (90° C., 30 MPa (300 atm)).

Therefore, the solubility of $CO_2$ dissolved in the material solution is enhanced. As a result, deposition of carbonate was promptly promoted, and the carbonate 55 was deposited on the surface and in the pores 53 of the organic matrix 51 quickly. Besides, since the deposition amount of the carbonate 55 was also increased, crystals of the carbonate 55 was sufficiently deposited on the surface and in the pores 53 of the organic matrix 51.

Obviously, numerous modifications and variations of the present invention are possible in light of the above teachings. It is therefore to be understood that, within the scope of the appended claims, the invention may be practiced otherwise than as specifically described here.

What is claimed is:

1. A method of manufacturing a carbonate film, comprising:
    filling a pressure container with:
        a base material having at least part of the surface coated with an organic matrix comprising at least one member selected from the group consisting of a carboxyl group, amino group, hydroxyl group, phosphonic acid group, phosphoric acid group, ammonium group, trimethyl ammonium group, sulfonic acid group, and sulfuric acid group, and
        a material solution comprising a carbonate material as a material for carbonate film and an organic polymer including at least one member selected from the group consisting of a carboxyl group, amino group, hydroxyl group, phosphonic acid group, phosphoric acid group, ammonium group, trimethyl ammonium group, sulfonic acid group, and sulfuric acid group, and
    supplying $CO_2$ into the pressure container at 2 atm or higher to deposit a carbonate film on the surface of the organic matrix.

2. The method of manufacturing carbonate film as claimed in claim 1, wherein the carbonate material comprises at least one member selected from the group consisting of Ca, Mg, Fe, Cu, Co, Mn, and Ni.

3. The method of manufacturing carbonate film as claimed in claim 1, wherein the carbonate material comprises at least one member selected from the group consisting of carboxylate, carbonate, alkoxide, oxide, hydroxide, chloride, nitrate, acetyl acetonate and derivatives thereof.

4. The method of manufacturing carbonate film as claimed in claim 2, wherein the carbonate material comprises at least one member selected from the group consisting of carboxylate, carbonate, alkoxide, oxide, hydroxide, chloride, nitrate, acetyl acetonate and derivatives thereof.

* * * * *